Nov. 1, 1927.
L. P. DELSASSO ET AL
1,647,905
DEVICE FOR TESTING INSULATORS CARRYING LIVE WIRES
Filed May 9, 1922   2 Sheets-Sheet 1
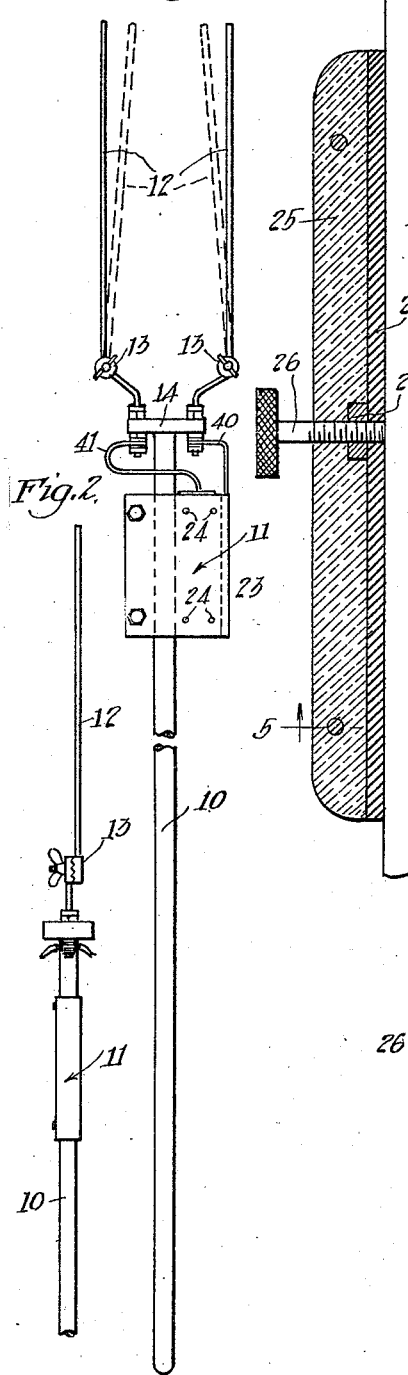
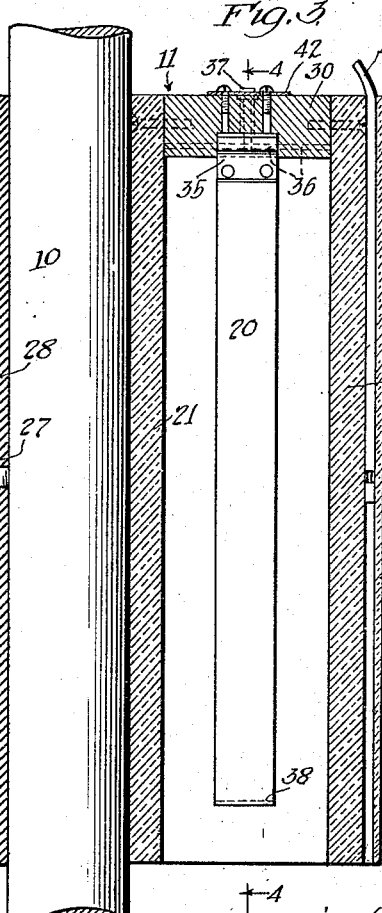
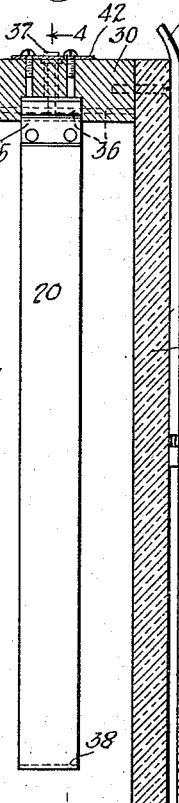
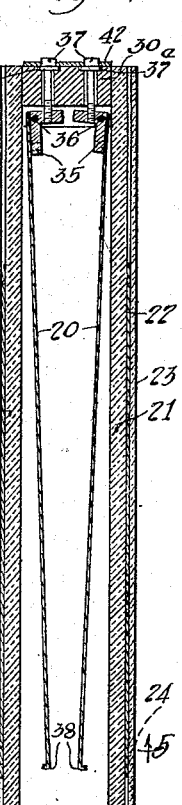
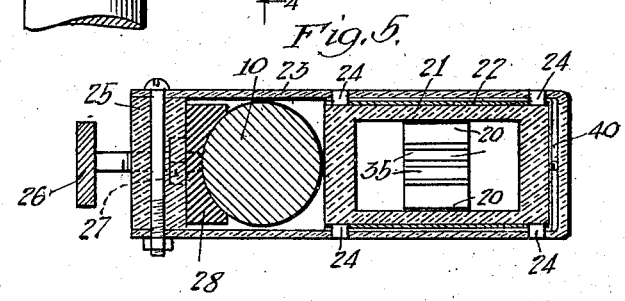
Inventors:
Leo P. Delsasso
Benjamin F. Dengler
Edwin R. Stauffacher
By James T. Barkelew
Their Attorneys

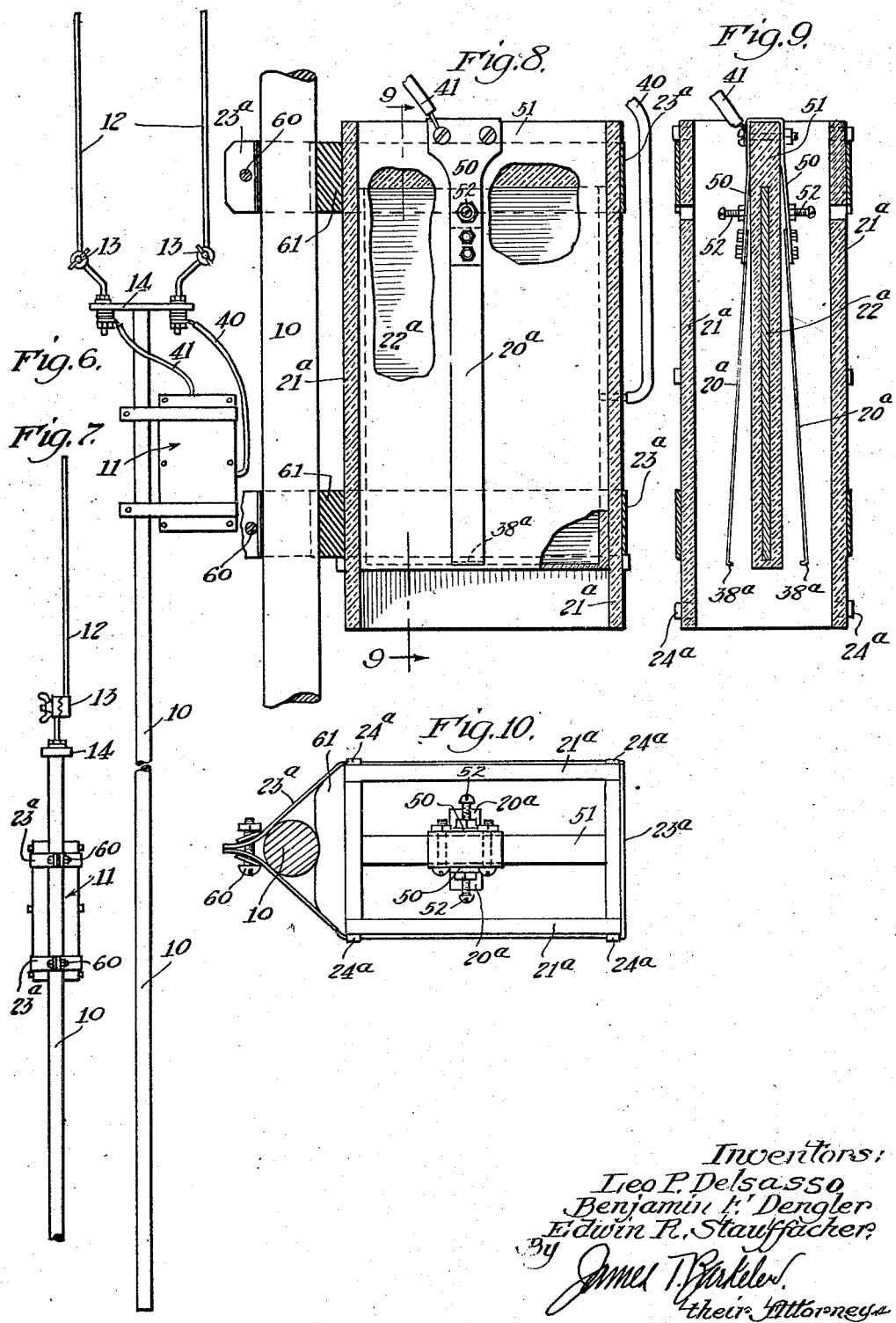

Patented Nov. 1, 1927.

1,647,905

UNITED STATES PATENT OFFICE.

LEO P. DELSASSO, BENJAMIN F. DENGLER, AND EDWIN R. STAUFFACHER, OF LOS ANGELES, CALIFORNIA.

DEVICE FOR TESTING INSULATORS CARRYING LIVE WIRES.

Application filed May 9, 1922. Serial No. 559,518.

On high tension transmission lines it is desirable periodically to test insulators in order to detect and replace any that have broken down, as regards their electrical characteristics. Methods of testing insulators have been used in the past that require the line to be de-energized if the work is to be done without danger to the lineman. The general object of the present invention is to provide a device by which the insulators may be easily and quickly tested, while the line is energized, without any danger to the person making the test, and without the necessity of short circuiting the insulator under test.

To this end our invention comprises an electrostatic volt meter of suitable sensitiveness, arranged in combination with a carrying member (preferably a long pole) and a pair of contact rods that may be placed in contact with opposite sides or ends of the insulator. When the device is put into operative position, if an insulator is in good operating condition, that fact is immediately visually shown by abnormal movement of the statically charged part of the device. If the insulator should be defective no such movement results.

There are several other features in our invention, accomplishing corresponding objects, all of which, however, will be best understood from detailed descriptions of typical forms of devices embodying the invention. For this purpose reference is had to the accompanying drawings.

Fig. 1 is a side elevation of one form of our device; Fig. 2 is another side elevation of the same; Fig. 3 is an enlarged longitudinal section of the indicator part of the device; Fig. 4 is a section taken as indicated by line 4—4 on Fig. 3; Fig. 5 is a cross section taken as indicated by line 5—5 on Figs. 3 and 4; Fig. 6 is a side elevation of another form of the device; Fig. 7 is another side elevation of the same; Fig. 8 is an enlarged longitudinal section of the indicator parts of this form of device; Fig. 9 is a section taken as indicated by line 9—9 on Fig. 8; and Fig. 10 is a plan of the parts shown in Fig. 8.

Describing first more particularly the details of the form shown in Figs. 1 to 5, it will be seen that there are used a long pole or other suitable carrier 10, which carries the indicator device 11, and the pair of contact rods 12. The contact rods are preferably arranged or made so that they may be adjusted, as to the distance between their two ends; this may be done by making the contact rods flexible in any suitable manner. For instance these rods may be pivotally adjustable at 13 to adjust the distance between their two ends to suit the linear distance between opposite terminals of an insulator. When we speak of terminals of an insulator we mean those parts between which there is a potential difference; as the two hardware fittings of a high tension insulator; or the top of an ordinary petticoat insulator and the peg or other member on which it is mounted. The contact rods are shown as mounted upon a T-head of insulating material 14 on the end of pole 10; and the indicator 11 is shown as mounted on the pole close to the T-head. The pole and head 14 may be made of any suitable insulating material. The pole is of sufficient length to guarantee the safety of the lineman while making tests.

The indicator device of the form here shown comprises primarily two changeable spaced members, at least one of which is movable, more specifically, a plate and a reed, the reed being movable; the two being connected to the two contact rods 12 so as to be oppositely charged. Although, as will be apparent when the action of the device is understood, a single movable reed is sufficient to give the indications desired, a pair of reeds with a suitable pair of plates gives a better visual indication. Accordingly, in the form of device shown in these figures, there is a pair of movable reeds 20, mounted inside a rectangular tube 21 of insulating material; and on opposite faces of the exterior of the tube, and opposite the two reeds, there are two metallic plates 22. This whole arrangement is surrounded by a sheathing or covering 23 which is preferably of fibre bent to the configuration more particularly shown in Fig. 5. Projections 24 (also preferably of fibre or the like) on the rectangular tube 21 extend through the plates 22 and the fibre sheath 23 to hold the parts in place. Between the free ends of the fibre sheath there is a block 25; and a set screw 26 (which works in a nut 27 set in block 25) may be set down against the pole 10 to hold the indicator 11 in any desired position around the pole. When the device is being used the indicator is turned to such a position on the pole, that the reeds 20 remain substantially in vertical planes, so that gravity will not tend to move them laterally at their free ends. A grooved bearing piece 28 may be placed between block 25 and the pole, as illustrated. All the parts of the indicator, except those necessarily made of metal, are made of fibre, bakelite, or some similar insulating material.

Reeds 20 are mounted upon a metal block 30 which closes one end of tube 21 (the end adjacent to the metal prongs 12). The two reeds are mounted on pivoted angle pieces 35, pivoted at 36; and screws 37 serve to adjust the position of these angle pieces 35 and thus serve to adjust the normal position of the reeds 20. The free ends of the reeds may extend approximately to the open end of tube 21.; and those free ends have laterally turned parts 38 whose comparatively broad surfaces, as viewed endwise through the open end of tube 21, enable the reeds to be distinctly seen by the tester. These reeds are, in a typical device, made of thin aluminum (approximately six thousandths of an inch thick). The mere end edge of such a piece is not easily visible. The broad surface afforded by the laterally turned parts at 38, however, is easily visible.

The two plates 22 are connected by wire 40 to one of the contact rods 12, while a wire 41 connects the other contact rod with a plate 42 and hence to the reeds 20. This plate 42 also overlies flanges $37^a$ on the screw heads so that the screws are longitudinally immovable with reference to block 30. When the device is being used the distance between the ends of rods 12 is adjusted to suit the size of the insulator being tested, and the rods are then put in contact with the two terminals of the insulator. Or, in testing suspension type insulators, these contact rods are put into contact with the terminals of the particular insulator under test. The indicator device 11 is adjusted so that it hangs down on the pole 10, or if free to swing, takes the vertical position. Under these conditions the reeds will give a proper indication of any defective insulator. The plates 22 and reeds 20 are oppositely electrostatically charged; and this opposite electrostatic charge has the effect of attracting the reeds towards the plates resulting in spreading the reeds apart. The sensitiveness of the instrument depends of course upon the distance between the reeds and the plates 22, upon the thickness of the dielectric wall 21, and the length, cross sectional area, and elasticity of the reeds 20. These factors may be so designed as to make the reeds more or less sensitive, and so that the reeds will show marked outward divergence for a comparatively small voltage difference between the charges on plates 22 and the reeds, or will only show a marked outward divergence for a comparatively large voltage difference. The testing device in any particular case, is designed and made so that it will show an easily visible divergence between the reeds when the difference in potential between opposite terminals of an insulator is up to normal. If an insulator has broken down, however, then the difference in potential between opposite terminals become less and the reeds will then shown little or no divergence. This divergence is very easily noted by the lineman making the test; particularly because the surfaces at the ends of the reeds are readily seen. The inclosing tube 21 may be made of black bakelite or some similar material and the material of the reeds, in this case aluminum, is such that the visual surfaces at 38 reflect enough light to be readily seen in the dark enclosure and their movements easily detected.

It will now be readily understood that one plate 22 and one reed 20 will operate to give the desired indication; but the double arrangement, including the two reeds that move in opposite directions, give a more distinctive indication, and one that is more readily seen by the lineman, patrolman, or other individual making the test.

In the form shown in Figs. 6 to 10 the general arrangement is the same as before described, but the indicator device 11 is slightly modified. Here we utilize a pair of reeds $20^a$ turned at their ends as indicated at $38^a$ and mounted at their inner ends on mounting members 50 that may be sprung away from the central dielectric slab 51 by the operation of suitable screws 52. Thus screws 52 serve to adjust the normal positions of reeds $20^a$. The wire 41 connects the reeds to one of the contact rods 12. The stationary plate, as shown at $22^a$, is in this case a single plate that is inserted in the central dielectric slab 51, and is connected by wire 40 to the other contact rod 12. The reeds and the plate are enclosed in a box or rectangular tube $21^a$ of insulating material; and this box may have projections $24^a$ that serve to keep the box from slipping longitudinally in the encircling bands $23^a$. These bands are preferably of fibre or some other suitable insulating or dielectric material, and at their ends they pass around the pole 10 and are secured together by bolts 60. Blocks preferably of an insulating material as shown at 61, may be placed between the pole 10 and the box $21^a$.

The operation of this last described form of device is substantially the same as the one previously described, except that the movement of the reeds, when electrostatically charged, is toward each other instead of away from each other.

It will now be seen how these devices provide means for detecting defective insulators on transmission and distribution lines and in or on generating stations or sub-stations, etc., without any danger to the man making the test. The test, as described, depends fundamentally upon the measurement of the potential differences at opposite terminals of the insulator (for instance, at the opposite hardware fittings of the insulator in the case of a suspension unit). The device is sufficiently sensitive to detect any defective insulator, even when such an insulator is on a dry cross-arm, and without having to make a metallic short circuit between the opposite terminals or the opposite hardware fittings of the insulator, or without having to ground either side of the insulator. For all these reasons, the danger of flashovers on insulators at the time of testing is reduced to a minimum. In our testing device no metallic circuit whatever is formed between opposite terminals of the insulators, and there is no appreciable passage of current through the testing device; the action of the testing device being entirely electrostatic.

Having described a preferred form of our invention, we claim:

1. An insulator tester embodying a carrier, a pair of spaced contacts thereon adapted to be touched to opposite terminals of an insulator, and a static potential indicator mounted on the carrier and comprising a pair of movable reeds and a pair of plates outside the reeds and each in opposition to one of the reeds, the reeds being connected to one contact and the plates to the other.

2. In an insulator tester, an enclosure, an angle bracket pivotally mounted at its angle in the enclosure, one arm of the bracket extending longitudinally of the enclosure and the other transversely thereof, an adjusting screw engaging the transverse arm, and a chargeable reed carried by the longitudinally extending arm.

In witness that we claim the foregoing we have hereunto subscribed our names this first day of May, 1922.

LEO P. DELSASSO.
BENJAMIN F. DENGLER.
EDWIN R. STAUFFACHER.